(12) United States Patent
Fan

(10) Patent No.: US 8,516,311 B2
(45) Date of Patent: Aug. 20, 2013

(54) SYSTEM AND METHOD FOR TESTING PERIPHERAL COMPONENT INTERCONNECT EXPRESS SWITCH

(75) Inventor: Chao-Tsung Fan, Tu-cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 293 days.

(21) Appl. No.: 13/159,365

(22) Filed: Jun. 13, 2011

(65) Prior Publication Data

US 2012/0054557 A1    Mar. 1, 2012

(30) Foreign Application Priority Data

Aug. 27, 2010 (TW) .................................. 99128775

(51) Int. Cl.
*G06F 11/00* (2006.01)
(52) U.S. Cl.
USPC ................. 714/43; 714/57; 714/748; 714/750

(58) Field of Classification Search
USPC ...................... 714/43, 57, 748, 750
See application file for complete search history.

(56) References Cited

U.S. PATENT DOCUMENTS

| 5,193,093 | A  | * | 3/1993 | Okazaki ........................ 714/750 |
| 7,773,531 | B2 | * | 8/2010 | Olgaard et al. ................ 370/241 |
| 8,362,791 | B2 | * | 1/2013 | Ueda et al. ............... 324/754.01 |
| 2009/0106636 | A1 | * | 4/2009 | Jenkins et al. ................ 714/804 |
| 2010/0082875 | A1 | * | 4/2010 | Sato ............................. 710/316 |

* cited by examiner

*Primary Examiner* — Charles Ehne
(74) *Attorney, Agent, or Firm* — Altis Law Group, Inc.

(57) ABSTRACT

A method tests peripheral component interconnect express (PCI-E) switches. A second PCI-E switch to be tested electronically connects to a first PCI-E switch of a computing device. A first data packet is created by the computing device and sent from the first PCI-E switch to the second PCI-E switch. A second data packet sent back by the second PCI-E switch is received by the computing device. The second PCI-E switch works normally if the first data packet is identical to the second data packet. The second PCI-E switch does not work normally if the first data packet is not identical to the second data packet.

13 Claims, 3 Drawing Sheets

SYSTEM AND METHOD FOR TESTING PERIPHERAL COMPONENT INTERCONNECT EXPRESS SWITCH

BACKGROUND

1. Technical Field

Embodiments of the present disclosure relate generally to switch testing, and more particularly, to a system and method for testing a peripheral component interconnect express (PCI-E) switch of a computing device.

2. Description of Related Art

PCI-E switches are used in computing devices, and the operating ability of the PCI-E switches must be tested. Usually, a PCI-E switch is tested using a circuit tester (ICT) or a flying probe. Because the ICT and the flying probe test are both open circuit tests, it is difficult and inconvenient to test the data transmission function of the PCI-E switch, so what is needed is a test method that overcomes the limitations described.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
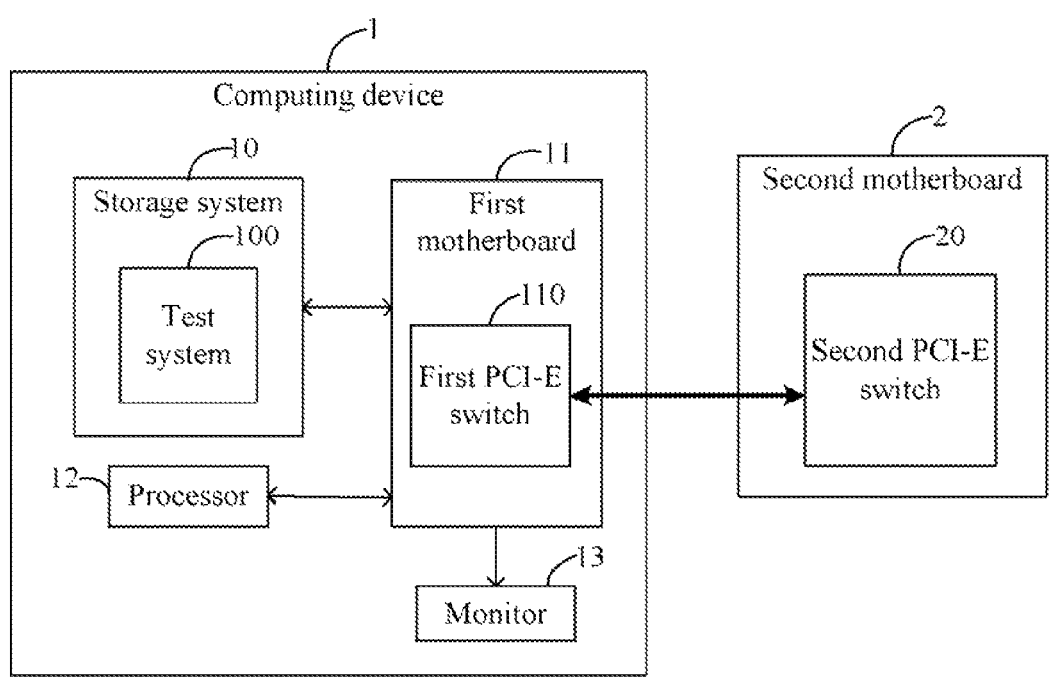
FIG. 1 is a block diagram of one embodiment of a computing device including a test system for testing a PCI-E switch.

FIG. 1 is a block diagram of one embodiment of a computing device 1 including a test system 100. In the embodiment, the computing device 1 further includes a storage system 10, a first motherboard 11, at least one processor 12 and a monitor 13. The first motherboard 11 includes a first PCI-E switch 110 that electronically connects to a second PCI-E switch 20 to be tested on a second motherboard 2. The test system 100 can test the data transmission function of the second PCI-E switch 20. The monitor 13 displays a test result of the second PCI-E switch 20. In one embodiment, the computing device 1 may be a desktop computer, a notebook computer, a server, a workstation or other. It should be apparent that FIG. 1 is just one example of the computing device 1 that can be included with more or fewer components than shown in other embodiments, or a different configuration of the various components.

The storage system 10 stores one or more programs, such as an operating system, and other applications of the computing device 1. In one embodiment, the storage system 10 may be random access memory (RAM) for temporary storage of information, and/or a read only memory (ROM) for permanent storage of information. In other embodiments, the storage system 10 may also be an external storage device, such as a hard disk, a storage card, or a data storage medium. The at least one processor 12 executes computerized operations of the computing device 1 and other applications, to provide functions of the computing device 1.

Figure 2:
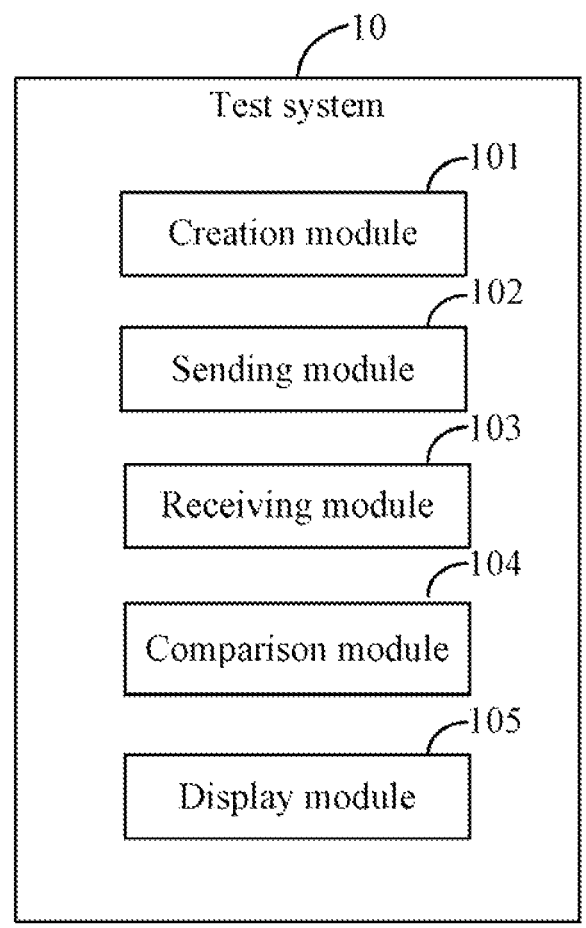
FIG. 2 is a block diagram of one embodiment of the functional modules of the test system included in the computing device of FIG. 1.

FIG. 2 is a block diagram of one embodiment of the functional modules of the test system 100 included in the computing device 1 of FIG. 1. The test system 100 may include a plurality of functional modules each comprising one or more programs or independent code and which can be accessed and executed by the at least one processor 12. In one embodiment, the test system 10 includes a creation module 101, a sending module 102, a receiving module 103, a comparison module 104, and a display module 105. In general, the word "module", as used herein, refers to logic embodied in hardware or firmware, or to a collection of software instructions, written in a programming language, such as, Java, C, or assembly. One or more software instructions in the modules may be embedded in firmware, such as EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Prior to testing, the second PCI-E switch 20 should be put into a loopback mode, which in this embodiment may be defined as a mode for the exchange of data between the first PCI-E switch 110 and the second PCI-E switch 20. In the loopback mode, the second PCI-E switch 20 returns the data packets to the first PCI-E switch 110 when the second PCI-E switch 20 receives data packets from the first PCI-E switch 110. Putting the second PCI-E switch 20 into the loopback mode can be done writing a loopback instruction to a register of the second PCI-E switch 20.

The creation module 101 is operable to create a first data packet using a plurality of formatted data. The first data packet consists of the formatted data that can be transmitted between the first PCI-E switch 110 and the second PCI-E switch 20.

The sending module 102 is operable to send the first data packet from the first PCI-E switch 110 to the second PCI-E switch 20. After the second PCI-E switch 20 receives the first data packet, the second PCI-E switch 20 generates a second data packet based on the first data packet, and sends back the second data packet to the first PCI-E switch 110.

The receiving module 103 is operable to receive the second data packet sent back by the second PCI-E switch 20.

The comparison module 104 is operable to compare the first data packet with the second data packet to generate a test result of the second PCI-E switch 20.

The display module 105 is operable to display the test result of the second PCI-E switch 20 on the monitor 13. If the first data packet is identical to the second data packet, the display module 105 activates the monitor 13 to display information indicating that the second PCI-E switch 20 works normally. If the first data packet is not identical to the second data packet, the display module 105 activates the monitor 13 to display an error code indicating that the second PCI-E switch 20 does not work normally.

Figure 3:
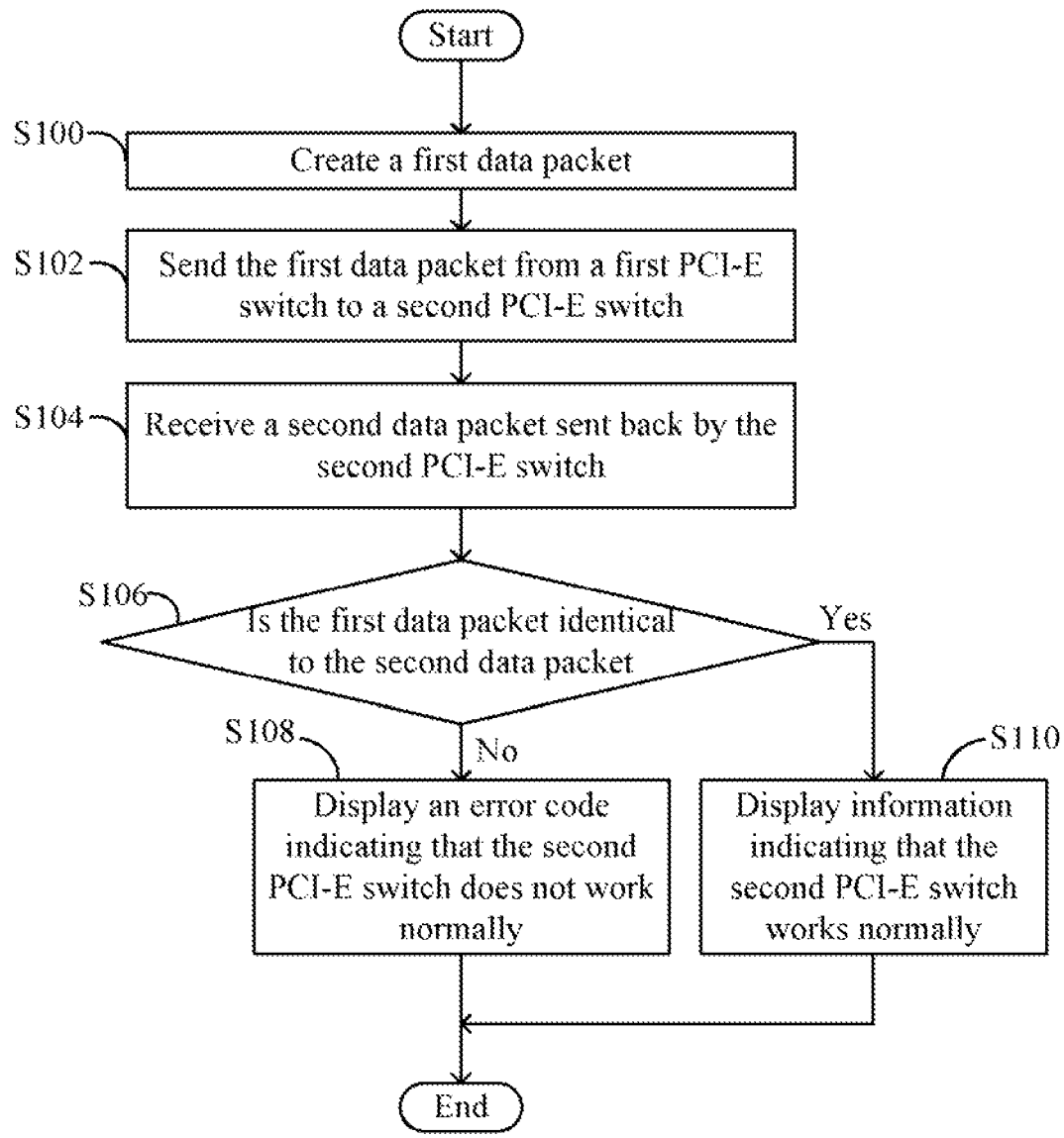
FIG. 3 is a flowchart of one embodiment of a method for testing a PCI-E switch using the test system of FIG. 1.

FIG. 3 is a flowchart of one embodiment of a method for testing a PCI-E switch using the test system 100 of FIG. 1. Depending on the embodiment, additional blocks may be added, others removed, and the ordering of the blocks may be changed.

In the embodiment, the second PCI-E switch 20 of the second motherboard 2 is to be tested, and is electronically connected to the first PCI-E switch 110 of the first motherboard 11. Before testing, the second PCI-E switch 20 is put into the loopback mode, and as described above, the loopback mode is defined as a mode for the exchange of data between the first PCI-E switch 110 and the second PCI-E switch 20.

In block S100, the creation module 101 creates a first data packet (which can be exchanged between the first PCI-E switch 110 and the second PCI-E switch 20) using a plurality of formatted data.

In block S102, the sending module 102 sends the first data packet from the first PCI-E switch 110 to the second PCI-E switch 20. After the second PCI-E switch 20 receives the first data packet, the second PCI-E switch 20 generates a second data packet based on the first data packet, and sends back the second data packet to the first PCI-E switch 110.

In block S104, the receiving module 103 receives the second data packet sent back by the second PCI-E switch 20.

In block S106, the comparison module 104 compares the first data packet with the second data packet. If the first data packet is not identical to the second data packet, block S108 is implemented. If the first data packet is identical to the second data packet, block S110 is implemented.

In block S108, the display module 105 activates the monitor 13 to display an error code indicating that the second PCI-E switch 20 does not work normally. In block S110, the display module 105 activates the monitor 13 to display information indicating that the second PCI-E switch 20 works normally.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A computing device, comprising:
   a storage system;
   at least one processor;
   a first motherboard;
   a first peripheral component interconnect express (PCI-E) switch that is located on the first motherboard, the first PCI-E switch electronically connecting to a second PCI-E switch of a second motherboard; and
   one or more programs stored in the storage system and executable by the at least one processor, the one or more programs comprising:
   a creation module operable to create a first data packet using a plurality of formatted data;
   a sending module operable to send the first data packet from the first PCI-E switch to the second PCI-E switch;
   a receiving module operable to receive a second data packet sent back by the second PCI-E switch;
   a comparison module operable to compare the first data packet with the second data packet to generate a test result of the second PCI-E switch;
   a display module operable to display the test result of the second PCI-E switch on a monitor of the computing device.

2. The computing device of claim 1, wherein the second PCI-E switch is put into a loopback mode.

3. The computing device of claim 2, wherein the loopback mode is defined as a mode for the exchange of data between the first PCI-E switch and the second PCI-E switch.

4. The computing device of claim 1, wherein the display module displays information indicating that the second PCI-E switch works normally, upon the condition that the first data packet is identical to the second data packet.

5. The computing device of claim 1, wherein the display module displays an error code indicating that the second PCI-E switch does not work normally, upon the condition that the first data packet is not identical to the second data packet.

6. A method for testing peripheral component interconnect express (PCI-E) switches of a computing device, the method comprising:
   (a) creating a first data packet using a plurality of formatted data by the computing device including a first PCI-E switch;
   (b) sending the first data packet from the first PCI-E switch to a second PCI-E switch that electronically connects to the first PCI-E switch;
   (c) receiving a second data packet sent back by the second PCI-E switch;
   (d) comparing the first data packet with the second data packet to generate a test result of the second PCI-E switch; and
   (e) displaying the test result of the second PCI-E switch on a monitor of the computing device.

7. The method of claim 6, wherein the second PCI-E switch is put into a loopback mode.

8. The method of claim 7, wherein the loopback mode is defined as a mode for the exchange of data between the first PCI-E switch and the second PCI-E switch.

9. The method of claim 6, wherein block (e) further comprises:
   displaying information for indicating that the second PCI-E switch works normally, upon the condition that the first data packet is identical to the second data packet; or
   displaying an error code for indicating that the second PCI-E switch does not work normally, upon the condition that the first data packet is not identical to the second data packet.

10. A non-transitory storage medium storing a set of instructions, the set of instructions capable of being executed by a processor of a computing device, causes the computing device to execute a method for testing peripheral component interconnect express (PCI-E) switches, the method comprising:
    (a) creating a first data packet using a plurality of formatted data by the computing device including a first PCI-E switch;
    (b) sending the first data packet from the first PCI-E switch to a second PCI-E switch that electronically connects to the first PCI-E switch;
    (c) receiving a second data packet sent back by the second PCI-E switch;
    (d) comparing the first data packet with the second data packet to generate a test result of the second PCI-E switch; and
    (e) displaying the test result of the second PCI-E switch on a monitor of the computing device.

11. The medium of claim 10, wherein the second PCI-E switch is put into a loopback mode.

12. The medium of claim 11, wherein the loopback mode is defined as a mode for the exchange of data between the first PCI-E switch and the second PCI-E switch.

13. The medium of claim 10, wherein block (e) further comprises:
    displaying information for indicating that the second PCI-E switch works normally, upon the condition that the first data packet is identical to the second data packet; or
    displaying an error code for indicating that the second PCI-E switch does not work normally, upon the condition that the first data packet is not identical to the second data packet.

* * * * *